US010280792B2

(12) United States Patent
Gons (10) Patent No.: US 10,280,792 B2
(45) Date of Patent: May 7, 2019

(54) BORE BASKET FOR A GAS POWERED TURBINE (71) Applicant: United Technologies Corporation, Hartford, CT (US)

(72) Inventor: William M. Gons, Juno Beach, FL (US)

(73) Assignee: United Technologies Corporation, Farmington, CT (US)

( * ) Notice: Subject to any disclaimer, the term of this patent is extended or adjusted under 35 U.S.C. 154(b) by 749 days.

(21) Appl. No.: 14/627,030

(22) Filed: Feb. 20, 2015

(65) Prior Publication Data

US 2015/0240723 A1    Aug. 27, 2015

Related U.S. Application Data (60) Provisional application No. 61/942,896, filed on Feb. 21, 2014, provisional application No. 61/942,866, filed on Feb. 21, 2014.

(51) Int. Cl.
F01D 5/08 (2006.01)
F02C 7/18 (2006.01)
F01D 25/12 (2006.01)

(52) U.S. Cl.
CPC .............. *F01D 25/12* (2013.01); *F01D 5/085* (2013.01); *F02C 7/18* (2013.01); *F05D 2240/20* (2013.01); *F05D 2260/205* (2013.01); *Y02T 50/676* (2013.01)

(58) Field of Classification Search
CPC .......... F01D 25/12; F01D 5/085; F01D 5/087; F05D 2260/205; F05D 2240/20; F05D 2240/24; F02C 7/12; F02C 7/18; F02C 7/24

See application file for complete search history.

(56) References Cited

U.S. PATENT DOCUMENTS

| 2,883,151 | A | | 4/1959 | Dolida |
| 3,647,313 | A | * | 3/1972 | Koff ................. F01D 5/084 415/115 |
| 3,844,110 | A | | 10/1974 | Widlansky et al. |
| 3,999,376 | A | | 12/1976 | Jeryan et al. |
| 4,190,398 | A | | 2/1980 | Corsmeier et al. |
| 4,893,984 | A | | 1/1990 | Davison et al. |

(Continued)

FOREIGN PATENT DOCUMENTS

| EP | 0267478 | 5/1988 |
| EP | 0894942 | 2/1999 |

(Continued)

OTHER PUBLICATIONS

European Search Report for Application No. EP 15155553.9 dated Jul. 24, 2015.

(Continued)

*Primary Examiner* — Alain Chau
(74) *Attorney, Agent, or Firm* — Carlson, Gaskey & Olds, P.C.

(57) ABSTRACT

Gas turbine engines include bore baskets to facilitate rotor bore cooling. One such bore basket for utilization in a gas turbine engine includes two cylinders that guide a cooling flow through a bore opening. The cylinders define an axially aligned gap that further directs fluid flow when a cooling fluid is injected into the system.

22 Claims, 8 Drawing Sheets

(56) References Cited

U.S. PATENT DOCUMENTS

| | | | |
|---|---|---|---|
| 5,271,711 A | | 12/1993 | McGreehan et al. |
| 6,155,040 A | * | 12/2000 | Sasaki ....................... F01D 5/00 416/95 |
| 6,361,277 B1 | | 3/2002 | Bulman et al. |
| 8,075,247 B2 | | 12/2011 | Romani et al. |
| 2007/0189890 A1 | | 8/2007 | Snowsill et al. |
| 2013/0192253 A1 | | 8/2013 | Ackermann et al. |
| 2015/0247409 A1 | | 9/2015 | Mittendorf et al. |

FOREIGN PATENT DOCUMENTS

| | | |
|---|---|---|
| EP | 1132578 | 9/2001 |
| GB | 2217785 | 1/1989 |

OTHER PUBLICATIONS

European Search Report for Application No. EP 15155557.0 dated Jul. 24, 2015.

\* cited by examiner

BORE BASKET FOR A GAS POWERED TURBINE

CROSS-REFERENCE TO RELATED APPLICATION

This application claims priority to U.S. Provisional Application No. 61/942,896 filed on Feb. 21, 2014 and U.S. Provisional Application No. 61/942,866 filed on Feb. 21, 2014.

STATEMENT REGARDING GOVERNMENT SUPPORT

This invention was made with government support under Contract No. FA8650-09-D-2923 awarded by the United States Air Force. The Government has certain rights in this invention.

TECHNICAL FIELD

The present disclosure relates to rotor bore cooling for a gas powered turbine, and more specifically to a bore basket for facilitating the same.

BACKGROUND

Gas powered turbines, such as those utilized in turbine engines for commercial aircraft, include a compressor section, a combustor section, and a turbine section. The compressor, combustor and turbine sections operate in conjunction with each other to generate rotation of a shaft that runs through each of the sections. In the case of some aircraft engines, the shaft drives a fan. In alternate example gas powered turbines, such as land based turbines, the rotation of the shaft is utilized to generate electrical power.

Each of the compressor section and the turbine section includes multiple rotors arranged sequentially along a fluid flowpath. Each rotor includes a rotor bore protruding radially inward toward the shaft. Some engines include a hot air flow aft of the rotors, relative to fluid flow through the gas powered turbine. Absent a mechanical separation, hot air from the hot air flow contacts the rotor bores and significantly increases the heat to which the rotor bores are exposed.

In some examples, the rotor bores are particularly heat sensitive, and a rotor basket is disposed between the rotor bores and the shaft. Existing bore baskets are constructed of a single metal cylinder disposed about the shaft. The rotor basket defines a hot air passageway between the rotor basket and the shaft, and the air from the hot air flow is passed to a return opening in the shaft through the passageway. The basket operates as a heat shield and a flow guide, providing separation between the hot air flow and sensitive rotor bores, and shielding the sensitive rotor bores from the heat of the hot air flow.

SUMMARY OF THE INVENTION

In one exemplary embodiment a gas turbine includes a compressor section, a combustor fluidly connected to the compressor, a turbine section fluidly connected to the combustor, and a rotor bore opening disposed radially inward of a plurality of rotors in one of the compressor section and the turbine section. The rotor bore opening is defined by a forward hub structure, a bore basket and a connection between the bore basket and an aft most rotor bore in the rotor bore opening. The bore basket defines a cylinder having an axis. The bore basket includes a radially outward first cylinder having at least one radially aligned opening on a first end of the bore basket, a radially inward second cylinder having a radially aligned opening on a second end of the bore basket opposite the first end, and being disposed within the radially outward first cylinder, and an axially aligned gap defined by the radially outward first cylinder and the radially inward second cylinder.

In another exemplary embodiment of the above described gas turbine, the first end of the bore basket is aftward relative to fluid flow, and wherein the second end of the bore basket is forward relative to fluid flow.

In another exemplary embodiment of any of the above described gas turbines, the radially outward first cylinder contacts the radially inward second cylinder at a radial protrusion on the second end of the bore basket, and contacts the radially inward second cylinder at a retaining structure on the first end of the bore basket.

In another exemplary embodiment of any of the above described gas turbines, the retaining structure is a retaining ring positioned aft of a pair of contact surfaces, the radially outward first cylinder contacts the radially inward second cylinder, the retaining ring is disposed at least partially within one of the radially outward first cylinder and the radially inward second cylinder, and the retaining ring contacts a radially aligned edge of the other of the radially outward first cylinder and the radially inward second cylinder.

In another exemplary embodiment of any of the above described gas turbines, the retaining structure is a radially protruding shoulder disposed on the radially inward second cylinder, and wherein the radially outward first cylinder contacts at least two surfaces of the shoulder.

In another exemplary embodiment of any of the above described gas turbines, a forward end of the first radially outward cylinder contacts a structure of the gas turbine.

In another exemplary embodiment of any of the above described gas turbines, one of the radially outward first cylinder and the radially inward second cylinder comprises a snap fit arm and the snap fit arm is disposed on the first end of the bore basket.

In another exemplary embodiment of any of the above described gas turbines, the snap fit arm comprises a radially aligned snap fit feature on an axial end of the snap fit arm.

Another exemplary embodiment of any of the above described gas turbines further includes a hub structure at least partially defining a forward wall of the rotor bore opening, and wherein the structure includes a cool air inlet into the rotor bore opening, and wherein the hub, the rotor bore opening, and the bore basket define a cool air flowpath from the inlet, along a radially outward surface of the first radially outward cylinder, through the radially aligned opening on a first end of the bore basket into the gap defined by the radially outward first cylinder and the radially inward second cylinder, and through the radially aligned opening on a second end of the bore basket opposite the first end.

In another exemplary embodiment of any of the above described gas turbines, the radially outward first cylinder and the radially inward second cylinder are maintained in position relative to each other at least in part via a tight fit connection between at least one contact surface of the radially inward cylinder and at least one contact surface of the radially outward cylinder.

In another exemplary embodiment of any of the above described gas turbines, the radially outward first cylinder and the radially inward second cylinder are maintained in position relative to each other at least in part via compression forces of gas turbine engine components external to the bore basket.

Another exemplary embodiment of any of the above described gas turbines further includes a mechanical interconnection connecting the radially outward first cylinder to the radially inward second cylinder, such that the radially outward first cylinder and the radially inward second cylinder are a unitary structure.

In another exemplary embodiment of any of the above described gas turbines, the mechanical interconnection is at least one of a brazed connection and a welded connection.

In another exemplary embodiment of any of the above described gas turbines, the bore basket further comprises a plurality of structural struts connecting the first radially outward cylinder to the radially inward cylinder, and wherein the plurality of structural struts are disposed circumferentially about the radially inward strut at least one axial position.

In another exemplary embodiment of any of the above described gas turbines, the plurality of structural struts are mechanically interconnected with at least one of the first radially outward cylinder and the radially inward cylinder, such that plurality of structural struts and the bore basket comprise a unitary structure.

In another exemplary embodiment of any of the above described gas turbines, the radially inward cylinder comprises a seat structure having an axially aligned surface, wherein the axially aligned surface of the seat structure contacts an inner surface of the first radially outward cylinder, and wherein the mechanical interconnection is a mechanical interconnection between the axially aligned surface of the seat structure and the inner surface of the first radially outward cylinder.

In one exemplary embodiment a bore basket arrangement includes a bore basket defining a cylinder having an axis, and wherein the bore basket includes a radially outward first cylinder having at least one radially aligned opening on a first end of the bore basket, a radially inward second cylinder having a radially aligned opening on a second end of the bore basket opposite the first end, and being disposed within the radially outward first cylinder, and an axially aligned gap defined by the radially outward first cylinder and the radially inward second cylinder.

In another exemplary embodiment of the above described bore basket arrangement, the radially outward cylinder and the radially inward cylinder are a unitary structure.

In another exemplary embodiment of any of the above described bore basket arrangements, the radially outward cylinder and the radially inward cylinder are separate structures.

An exemplary method for cooling rotor bores in a rotor bore opening includes injecting cool air into a fore end of a rotor bore opening, directing the cool air to an aft end of the rotor bore opening along an exterior surface of a bore basket, defining an internal fluid passageway in the bore basket as a gap between a radially inward cylinder and a radially outward cylinder, where the radially outward cylinder and the radially inward cylinder are one of a unitary structure and a separate structure, and returning the cool air to a fore end of the bore basket through the internal fluid passageway of the bore basket.

These and other features of the present invention can be best understood from the following specification and drawings, the following of which is a brief description.

DETAILED DESCRIPTION OF AN EMBODIMENT

Figure 1:
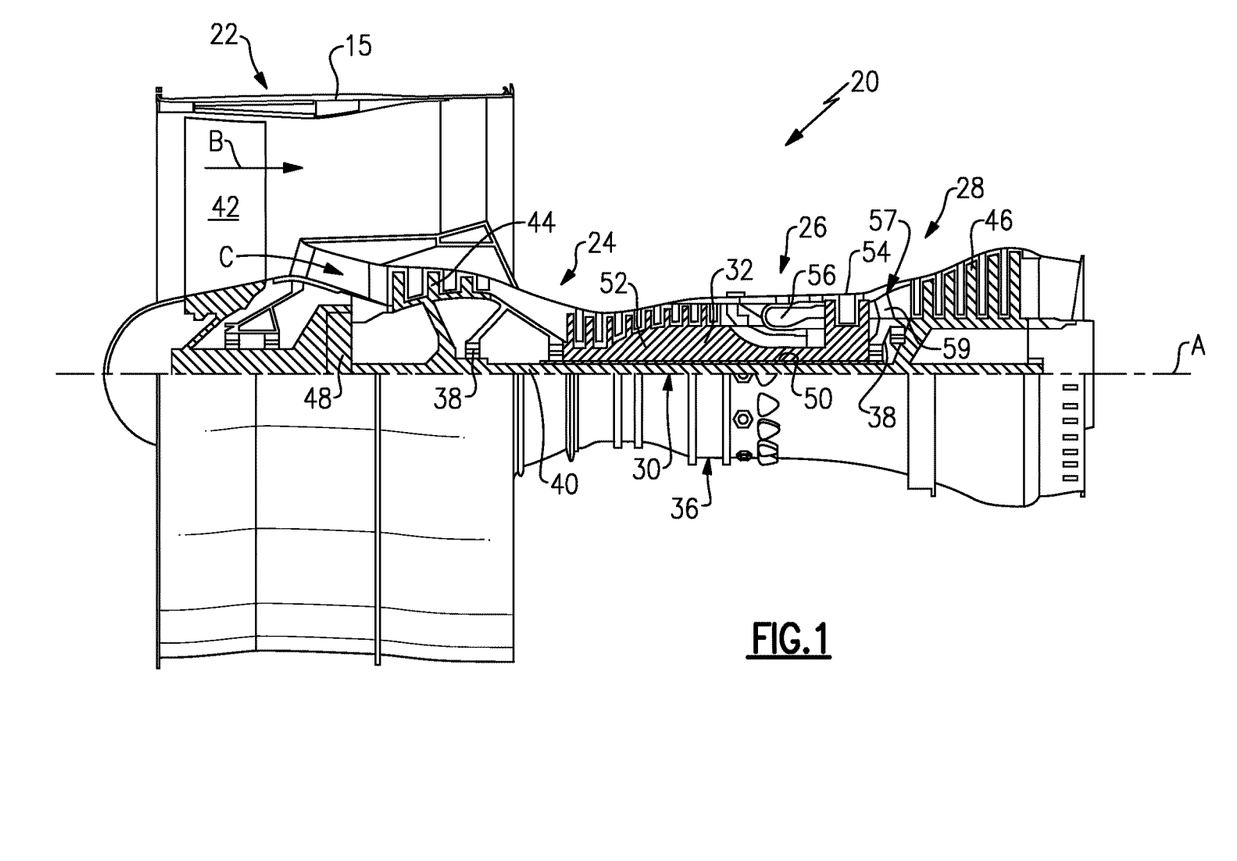
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core air flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In some examples, the engine 20 can be an engine without a geared system, such as a low bypass engine.

Figure 2:
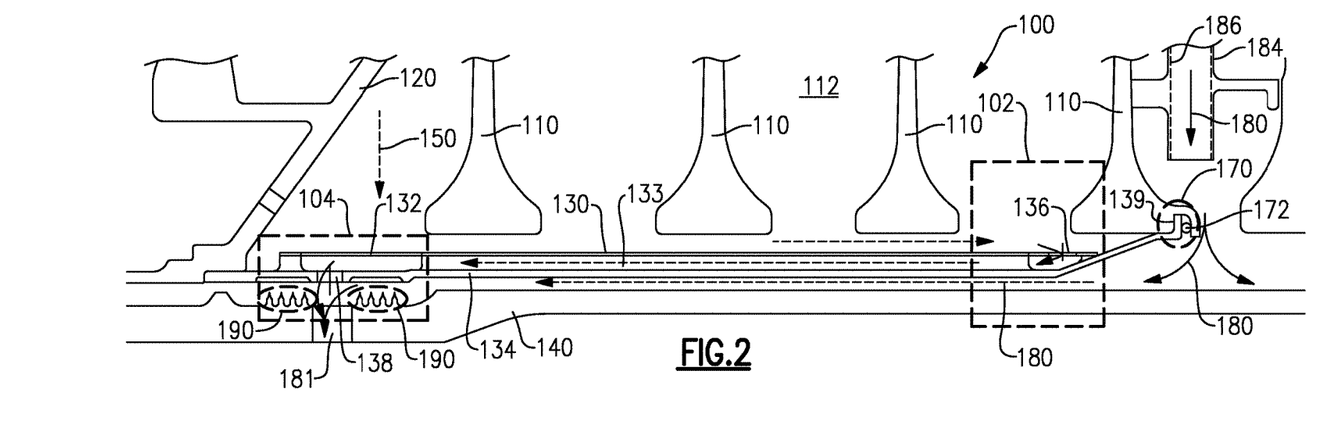
FIG. 2 schematically illustrates a rotor portion of the gas turbine engine.

FIG. 2 illustrates a rotor bore section 100 including a bore basket 130 disposed about a shaft 140. The rotor bore section 100 corresponds to either the compressor section 24 or the turbine section 28 of the gas turbine engine 20 of FIG. 1.

Each rotor in the corresponding section 24, 28 includes a rotor bore 110 that extends radially inward toward the shaft 140. The rotor bores 110 are disposed in a rotor bore opening 112 that is defined by the bore basket 130, a hub structure 120 located fore of the rotor bore opening 112, and a snap fit arm 170 connecting the bore basket 130 and an aft most rotor bore 110. A retaining ring 172 maintains the connection between the bore basket 130 and the aft most rotor bore 110, and prevents air leakage between the rotor bore opening 112 and adjacent air flows.

Immediately aft of the rotor bore section 100 is a hot air connection 184, which provides a hot air flow 180 through an anti-vortex tube 186, or any other hot air supply. In some gas turbine engines 20, the rotor bores 110 are sensitive to high temperatures, and the heat from the hot air flow 180 can reduce the performance of the rotor bores 110 if the hot air is allowed to contact the rotor bores 110. To prevent the hot air flow 180 from heating the rotor bores 110, the bore basket 130 isolates the hot air flow 180 from the air in the rotor bore opening 112.

The bore basket 130 is constructed of a first, radially outward cylinder 132 and a second, radially inward cylinder 134. A fluid passageway 133 is defined by a radial gap between the radially outward cylinder 132 and the radially inward cylinder 134. A radially aligned opening 136 is positioned in the radially outward cylinder 132 at a first end 102 and allows air to flow from the bore opening 112 into the fluid passageway 133. Similarly, a radially aligned opening 138 in the radially inward cylinder 134 is positioned at a second end 104. The radially outward cylinder 132 and the radially inward cylinder 134 are mechanically interconnected such that the bore basket 130 is a single, unitary, structure.

To further cool the rotor bore section 100, a cold air flow 150 is provided from the forward hub structure 120 into the rotor bore opening 112. The radially outward cylinder 132 of the bore basket 130 forces the cold air flow 150 to flow aft, under the rotor bores 110 along the exterior surface of the rotor bore basket 130. The cold air flow 150 contacts and cools each of the rotor bores 110. Once the cold air flow 150 reaches the first end 102 of the bore basket 130, the cold air flow 150 passes through the radially aligned opening 136 in the radially outward cylinder 132 and into the fluid passageway 133.

The bore basket 130 forces the cold air flow 150 along the fluid passageway 133 to the radially aligned opening 138 at the second end 104 of the radially inward cylinder 134. The cold air flow 150 then passes through the radially aligned opening 138 and joins with the hot air flow 180 at a combined air flow 182. The combined air flow 182 passes through an opening 181 in the shaft 140 and is expelled from the system. In some examples, the expelled air is used elsewhere in the engine. In some examples, the radially aligned openings 136, 138 are multiple openings circumferentially disposed about the corresponding cylinder 132, 134. In these examples, the radially aligned openings 136, 138 are located at approximately the same axial position, relative to an axis defined by the bore basket 130.

Protruding from the shaft 140 and adjacent to the opening 181 on the shaft 140 are multiple sealing elements 190. The sealing elements 190 allow air to pass from the aft side of the sealing elements 190 to the opening 181. As air passes through the seals, the pressure of the air is decreased. This results in a decrease in the pressure of the hot air flow 180 as it crosses the sealing elements 190 to the opening 181. Absent the pressure drop from the sealing elements 190, hot air from the hot air flow 180 can pass through the bore basket 130 into the bore opening 112 in a backflow manner, due to the lower pressure of the cold air flow 150 relative to the hot air flow 180. Radially outward of the shaft opening 181, and radially inward of the radially aligned opening 138 in the radially inward cylinder 134, the hot air flow 180 joins an air flow from the rotor bore opening 112.

Figure 3:
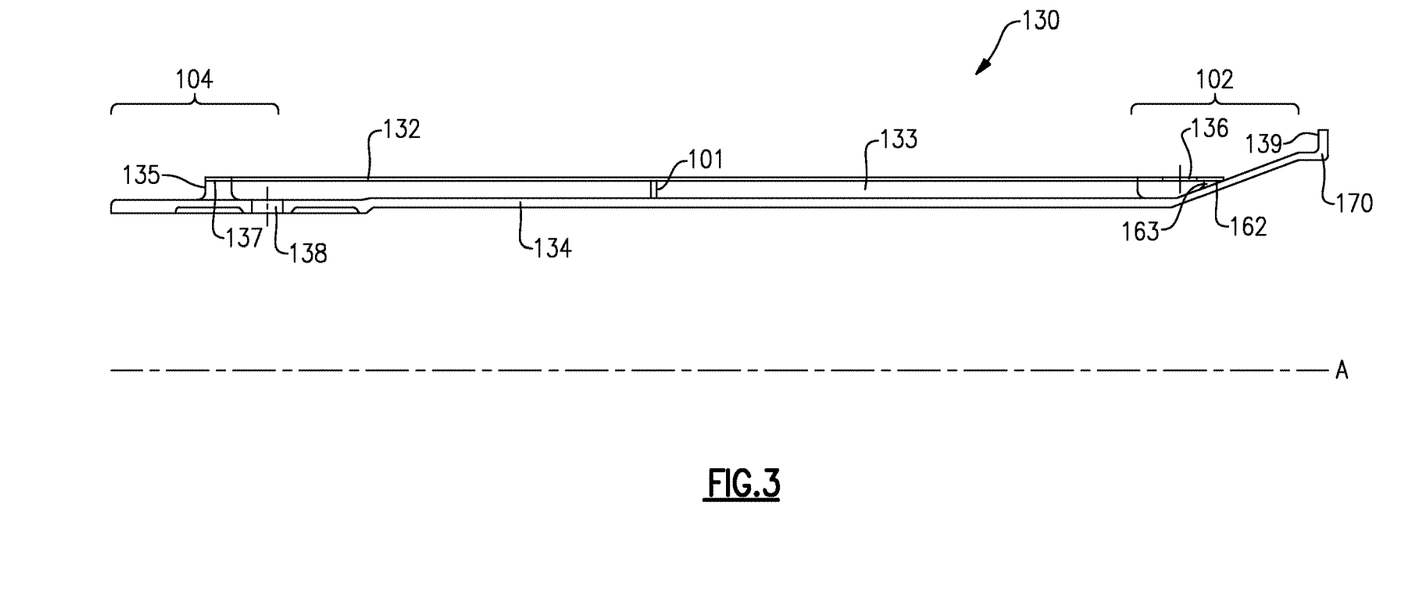
FIG. 3 schematically illustrates a cross section of the bore basket of FIG. 2, isolated from the gas turbine engine.

With continued reference to FIG. 2, and with like numerals indicating like elements, FIG. 3 schematically illustrates a cross section of the bore basket 130 of FIG. 2 isolated from the gas turbine engine 20. The bore basket 130 includes a radially outward cylinder 132 and a radially inward cylinder 134. The radially inward cylinder 134 is disposed within the outward cylinder 132, and the two cylinders 132, 134 are generally coaxial, defining a single axis A. The inner and outward cylinders 132, 134 define a fluid passageway 133 in a gap between the two cylinders 132, 134.

The radially outward cylinder 132 includes a radially aligned opening 136 on a first end 102 of the bore basket 130. In alternate examples, the radially outward cylinder 132 can include multiple radially aligned openings 136 disposed about the circumference of the first end 102 of the outward cylinder 132. Similarly, the radially inward cylinder 134 includes a radially aligned opening 138 disposed at the second end 104 of the bore basket 130. In alternate examples, the radially inward cylinder 134 can include multiple radially aligned openings 138 disposed about the circumference of the second end 104.

Referring still to FIGS. 2 and 3, the radially outward cylinder 132 and the radially inward cylinder 134 contact each other at a first end 102 contact surface 162 and a second end 104 contact surface 137. The second end 104 contact surface 137 is defined on a radial protrusion 135 of the radially inward cylinder 134. The first end 102 contact surface 162 is positioned on a shelf feature 163 of the radially inward cylinder 134. At the contact surfaces 137, 162 the radially outward cylinder 132 and the radially inward cylinder 134 are mechanically interconnected. In some examples, the mechanical interconnection is achieved via a brazing process that metallurgically joins the cylinders 132, 134 together into a single, unitary piece. In alternate examples, the mechanical interconnection is achieved via a welding process, or any other process that results in joining the two cylinders 132, 134 into a single unitary piece.

In the illustrated example of FIG. 3, the arrangement of the cylinders 132, 134 is structurally supported via at least one structural strut 101. The structural strut 101 is disposed within the fluid passageway 133 defined by the cylinders 132, 134 and provides structural support to the fluid passageway. In some examples, the structural struts 101 can be multiple struts disposed circumferentially about the fluid passageway. In other examples the structural strut 101 can be a single sheet of material, such as a metal, that contacts both the radially inward cylinder 134 and the radially outward cylinder 132. In the alternate example, the structural strut includes multiple openings in the sheet of material. The openings allow fluid to pass through the structural strut 101. In either case, the structural strut 101 is physically connected to at least one of the cylinders 132, 134 and provides structural support. Furthermore, the structural strut 101 is configured in a manner so as not to significantly impede air flow passing through the passageway 133. In yet another alternate example, the structural struts run from the second end 104 to first end 102, in alignment with the fluid flow.

In alternate examples, such as the example illustrated in FIG. 4 and described below, structural struts 101 can be placed at multiple axial positions to provide additional structural support. Depending on the configuration of the structural strut 101, the structural struts 101 can also serve as flow guides, guiding and directing the flow through the fluid passageway 133. Flow guides can also alter fluid flow characteristics through the fluid passageway 133. By way of example, structural struts 101 arranged as fluid flow guides can impart swirl on or eliminate swirl from a fluid passing through the fluid passageway 133.

The radially inward cylinder 134 further includes a snap fit arm 170 that provides a snap fit against an adjacent rotor bore 110 (illustrated in FIG. 2) when the bore basket 130 is in an installed position. In the installed position, a radially aligned surface 139 at the second end 104 of each of the radially inward cylinder 134 and the radially outward cylinder 132 contacts an adjacent hub structure 120 (illustrated in FIG. 2). The snap fit of the snap fit arm 170 and the contact with the hub structure 120 maintain the bore basket 130 in axial position relative to the engine static structure. In an alternate example, the snap fit arm 170 is replaced with a loose fit arm that provides a loose fit connection against the adjacent rotor bore 110.

Figure 4:
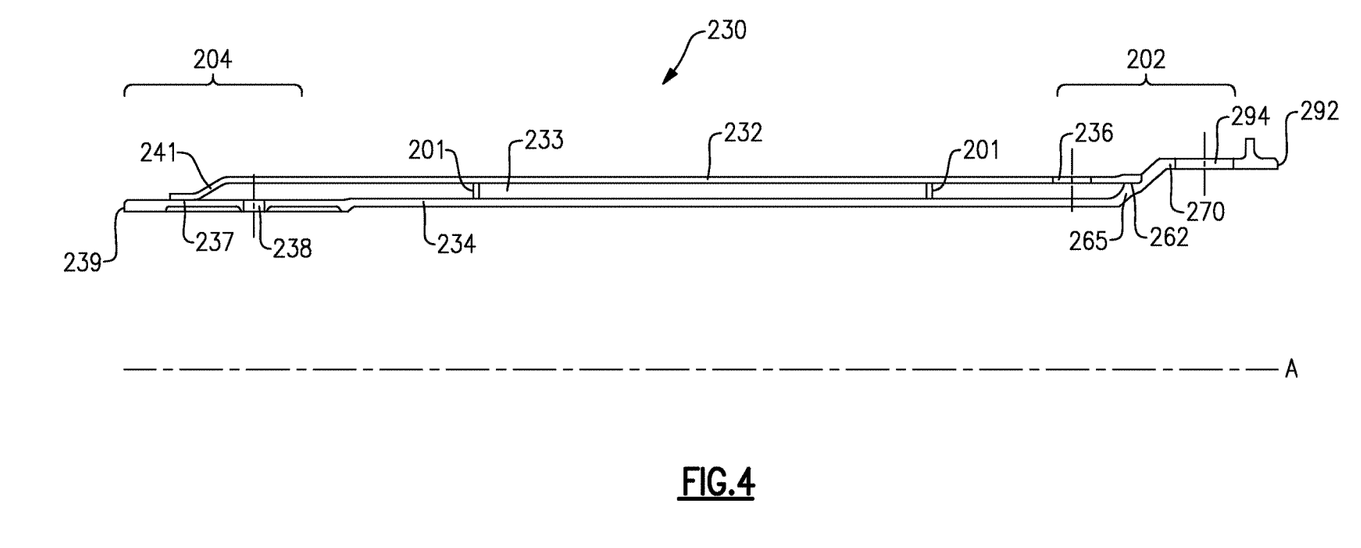
FIG. 4 schematically illustrates a cross section of an alternate bore basket isolated from the gas turbine engine.

With continued reference to FIGS. 2 and 3, and with like numerals indicating like elements, FIG. 4 schematically illustrates a cross section of an alternate example bore basket 230. As with the example of FIG. 3, the bore basket 230 includes a radially outward cylinder 232 and a radially inward cylinder 234. The radially inward cylinder 234 is disposed within the radially outward cylinder 232, and the two cylinders 232, 234 are generally coaxial, defining a single axis A. The radially inward and outward cylinders 232, 234 define a fluid passageway 233 in a gap between the two cylinders 232, 234.

The radially outward cylinder 232 includes a radially aligned opening 236 on a first end 202 of the bore basket 230. In alternate examples, the radially outward cylinder 232 can include multiple radially aligned openings 236 disposed about the circumference of the first end 202 of the radially outward cylinder 232. Similarly, the inward cylinder 234 includes a radially aligned opening 238 disposed at the second end 204 of the bore basket 230. In alternate examples, the radially inward cylinder 234 can include multiple radially aligned openings 238 disposed about the circumference of the second end 204.

The radially outward cylinder 232 contacts the radially inward cylinder 234 at a first end 202 contact surface 262 and a second end 204 contact surface 237. The second end 204 contact surface 237 is a contact surface between a radially outward facing portion of the radially inward cylinder 234 and a radially inward facing surface of a radially inward protruding arm 241 on the second end of the radially outward cylinder 232. The first end contact surface 262 is a contact surface between a radially inward facing surface of the radially outward cylinder 232 and a step portion 265 of the first end 202 of the radially inward cylinder 234.

The first end 202 of the radially inward cylinder further includes a snap fit arm 270 that includes a snap fit feature 292 and a hot air flow opening 294. When the bore basket 230 is in the installed position, the snap fit feature 292 of the snap fit arm 270 contacts a rotor aft of the rotor bore opening. The hot air flow opening 294 lines up with an air inlet form an anti-vortex tube, or other hot air source, and allows hot air to pass under the bore basket 230 and flow between the shaft and the bore basket 230. As above, the snap fit arm 270 can, in some examples, be replaced with a loose fit arm and the snap fit feature 292 can be replaced with a loose fit feature.

On the second end 204, the radially outward cylinder 232 includes an axial end surface 239. The axial end surface 239 contacts a fore hub structure 220 (illustrated in FIG. 5) when the bore basket 230 is installed. The contact with the fore hub structure 220 and the contact with the aftward rotor bore prevents the bore basket 230 shifting axially relative to a turbine static structure.

As with the example of FIG. 3, the bore basket 230 of FIG. 4 includes multiple structural struts 201. The structural struts 201 of FIG. 4 operate in the same manner and serve the same function as the structural struts 101 of FIG. 3. In an alternate example, the structural struts 201 run from the second end 204 to the first end 202 in alignment with the fluid flow.

Figure 5:
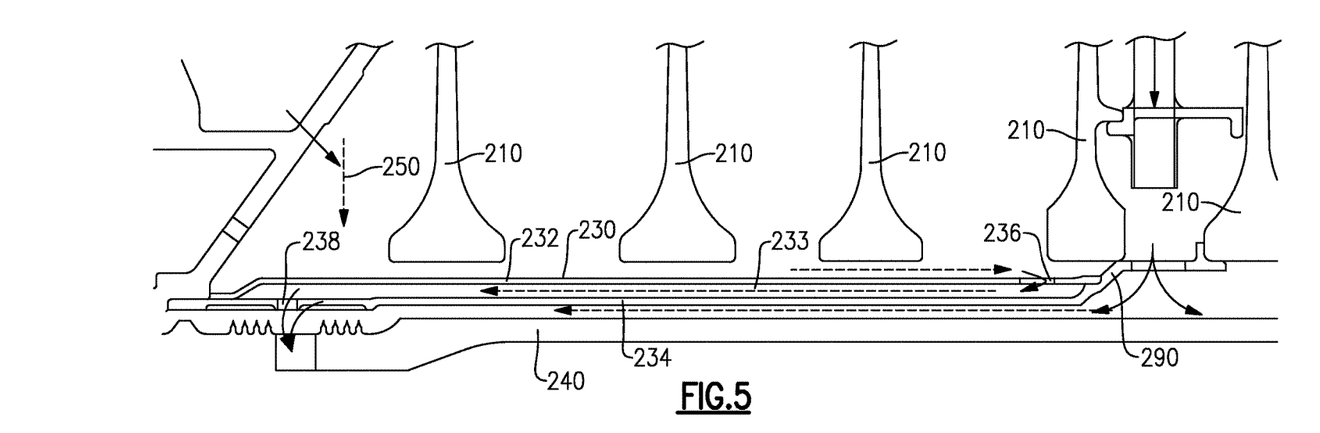
FIG. 5 schematically illustrates the alternate bore basket of FIG. 4 in a gas powered turbine.

With continued reference to FIGS. 2 and 4, and with like numerals indicating like elements, FIG. 5 schematically illustrates the alternate bore basket 230 of FIG. 4 installed in a gas powered turbine. As with the example bore basket 130 of FIG. 2, the bore basket 230 directs a cold air flow 250 across the rotor bores 210 and into a fluid passageway 233 in the bore basket 230. The snap fit arm 290 of the bore basket 230 connects to an aft most rotor bore 210, and a foremost surface 239 of the bore basket 230 contacts the rotor hub structure 220. The example bore basket 230 of FIG. 5 isolates a hot air flow 280 from the cold air flow 250, and prevents backflow into a rotor bore opening 212 in the manner described above with regards to FIG. 2.

Figure 6:
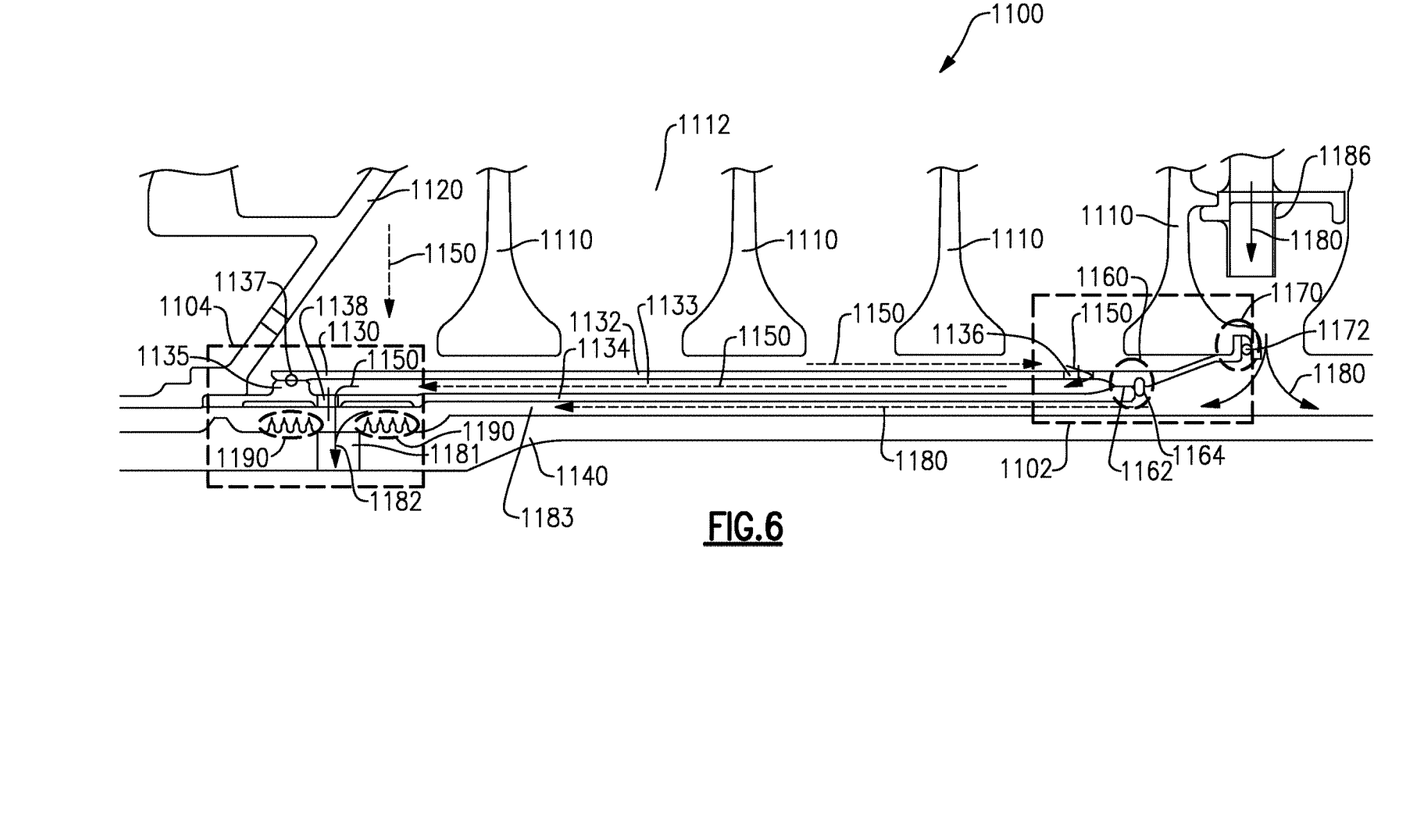
FIG. 6 schematically illustrates an alternate rotor portion of the gas turbine engine.

With continued reference to FIG. 1, FIG. 6 illustrates a rotor bore section 1100, including a multi-piece bore basket 1130. The rotor bore section 1100 corresponds to either the compressor section 24 or the turbine section 28 of the gas turbine engine 20 of FIG. 1.

Each rotor in the corresponding section 24, 28 includes a rotor bore 1110 that extends radially inward toward a shaft 1140. The rotor bores 1110 are disposed in a rotor bore opening 1112 that is defined by a multi-piece bore basket 1130 disposed about a shaft 1140, a hub structure 1120 located fore of the rotor bore opening 1112, and a snap fit arm 1170 of the multi-piece bore basket 1130 connecting the multi-piece bore basket 1130 to an aft most rotor bore 1110. A retaining ring 1172 maintains the connection between the multi-piece bore basket 1130 and the aft most rotor bore 1110, and prevents air leakage between the rotor bore section 1112 and adjacent air flows. In alternate examples, the snap fit arm 1170 can be replaced with a loose fit connection that can slide.

Aft of the rotor bore section 1100 is a hot air connection, which provides a hot air flow 1180 through an anti-vortex tube 1186. To prevent the hot air flow 1180 from heating the rotor bores 1110, the multi-piece bore basket 1130 is positioned 1100 about the shaft 1140 and defines a fluid passageway 1183 between the shaft 1140 and the multi-piece bore basket 1130. In this way, the multi-piece bore basket 1130 isolates the hot air flow 1180 from the air in the rotor bore opening 1112.

The multi-piece bore basket 1130 is constructed of a first, radially outward cylinder 1132 and a second, radially inward cylinder 1134. A fluid passageway 1133 is defined by a radial gap between the radially outward cylinder 1132 and the radially inward cylinder 1134. A radially aligned opening 1136 is positioned in the radially outward cylinder 1132 at a first end 1102 of the multi-piece bore basket 1130 and allows air to flow from the rotor bore opening 1112 into the fluid passageway 1133. Similarly, a radially aligned opening 1138 in the second, radially inward cylinder 1134 is positioned at a second end 1104 of the multi-piece bore basket 1130.

Protruding from the shaft 1140, and adjacent to an opening 1181 on the shaft 1140, are multiple sealing elements 1190. The sealing elements 1190 allow air to pass from the aft side of the sealing elements 1190 to the opening 1181, and decrease the pressure of air passing through the sealing elements 1190. This decreases the pressure of the hot air flow 1180 as it crosses the sealing elements 1190 to the opening 1181. The cold air flow 1150 is at a lower pressure than the injected hot air flow 1180. Radially outward of the shaft opening 1181, and radially inward from the radially aligned opening 1138 in the radially inward cylinder 1134, the hot air flow 1180 joins the cold air flow 1150 from the rotor bore opening 1112. Without the decrease in pressure from the sealing elements 1190, the higher pressure of the hot air flow 1180 will cause a backflow of hot air into the rotor bore opening 1112 through the multi-piece bore basket 1130. The forward sealing element 1190 stops the hot air from leaking forward and forces it down into the shaft 1181.

In the illustrated example, the cold air flow 1150 is provided from the forward hub structure 1120 into the rotor bore opening 1112 to further cool the rotor bore section 1100. In alternate examples, the cold air flow 1150 can come from anywhere forward of the hot air 1180. The first radially outward cylinder 1132 of the multi-piece bore basket 1130 forces the forward cold air flow 1150 to flow aft, under the rotor bores 1110. The cold air flow 1150 is directed along the exterior surface of the multi-piece bore basket 1130 and cools each of the rotor bores 1110. Once the cold air flow 1150 reaches the first end 1102 of the multi-piece bore basket 1130, the cold air flow 1150 passes through the radially aligned opening 1136 in the radially outward cylinder 1132 and into the fluid passageway 1133.

The positioning of the radially outward cylinder 1132 and the radially inward cylinder 1134 of the multi-piece bore basket 1130 forces the cold air flow 1150 along the fluid passageway 1133 to the radially aligned opening 1138 at the second end 1104 of the radially inward cylinder 1134. The cold air flow 1150 then passes through the radially aligned opening 1138 and joins with the hot air flow 1180 at a combined air flow 1182. The combined air flow 1182 passes through the opening 1181 in the shaft 1140 and is expelled from the bore basket flow. In some examples, the radially aligned openings 1136, 1138 are multiple openings disposed circumferentially about the corresponding cylinder 1132, 1134. In these examples, the radially aligned openings are located at approximately the same axial position, relative to an axis defined by the multi-piece bore basket 1130.

Figure 7:
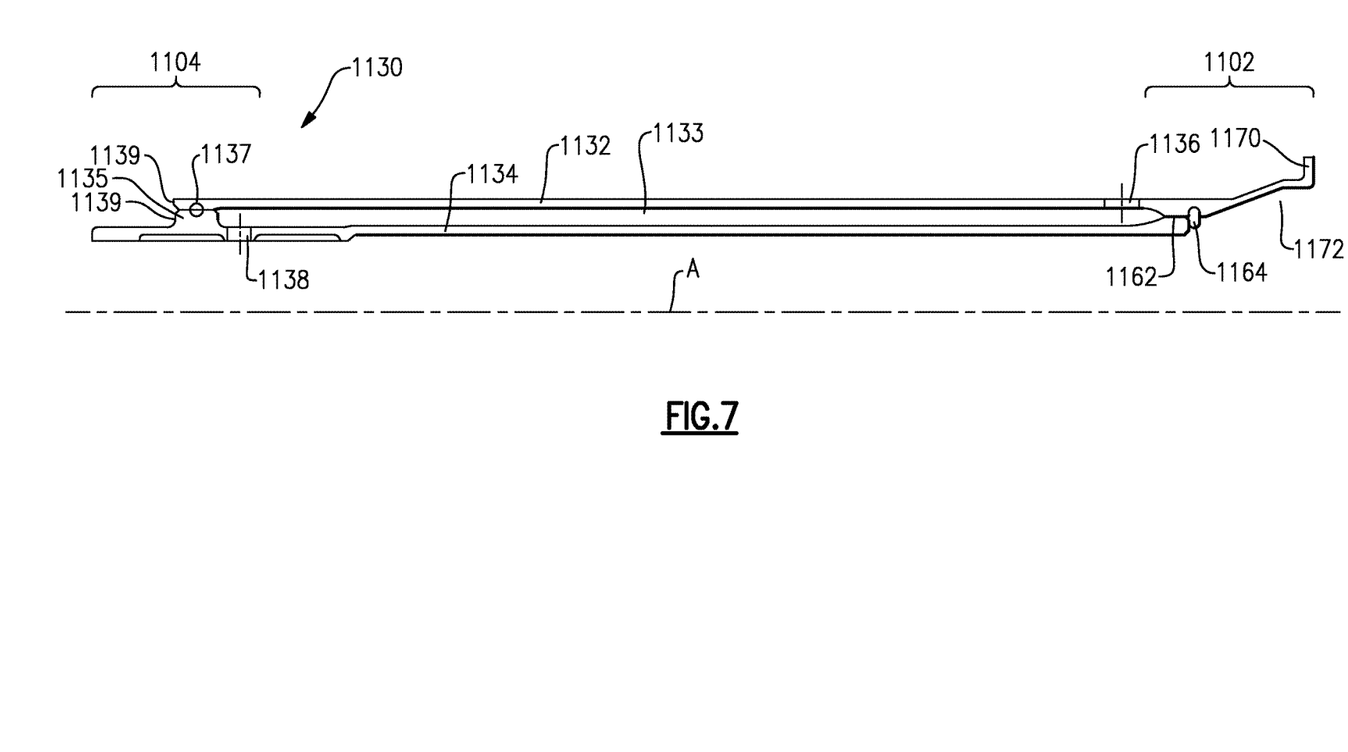
FIG. 7 schematically illustrates a cross section of the multi-piece bore basket of FIG. 6, isolated from the gas turbine engine.

With continued reference to FIG. 6, and with like numerals indicating like elements, FIG. 7 schematically illustrates a cross section of the multi-piece bore basket 1130 of FIG. 6 isolated from the gas turbine engine 20. The multi-piece bore basket 1130 includes an outward cylinder 1132 and an inward cylinder 1134. The inward cylinder 1134 is disposed within the outward cylinder 1132, and the two cylinders 1132, 1134 are generally coaxial, defining a single axis A. The inward and outward cylinders 1132, 1134 define a fluid passageway 1133 in a gap between the two cylinders.

The outward cylinder 1132 includes a radially aligned opening 1136 on the first end 1102 of the multi-piece bore basket 1130. In alternate examples, the radially outward cylinder 1132 can include multiple radially aligned openings disposed about the circumference of the first end 1102 of the outward cylinder 1132. Similarly, the radially inward cylinder 1134 includes a radially aligned opening 1138 disposed at the second end 1104 of the multi-piece bore basket 1130. In alternate examples, the radially inward cylinder 1134 can include multiple radially aligned openings 1138 disposed about the circumference of the second end 1104.

The cylinders 1132, 1134 contact each other at the first end 1102 contact surface 1162 and a second end 1104 contact surface 1137. The second end 1104 contact surface 1137 is defined on a radial protrusion 1135 that protrudes from the radially inward cylinder 1134. The inner diameter of the radially outward cylinder 1132 is sized such that the radially outward cylinder 1132 is tight fit to the radially inward cylinder 1134 at both the contact surfaces 1137, 1162. Each of the two cylinders 1132, 1134 are distinct components and are maintained in position relative to each other in a gas turbine engine via the tight fit in some examples, and via compression forces from other gas turbine engine components in other examples. In yet further examples, the two cylinders are maintained in position relative to each other via a combination of a tight fit contact and the above mentioned compression forces.

Further maintaining the relative axial positions of the radially outward cylinder 1132 and the radially inward cylinder 1134 is a retaining structure 1164. In the illustrated example of FIG. 7, the retaining structure 1164 is a retaining ring that is partially disposed in the radially outward cylinder 1132, and contacts a radially aligned surface of the radially inward cylinder 1134.

The radially outward cylinder 1132 further includes a snap fit arm 1170 that provides a snap fit against an adjacent rotor bore 1110 (illustrated in FIG. 6) when the multi-piece bore basket 1130 is in an installed position. When the multi-piece bore basket 1130 is in an installed position, a radially aligned surface 1139 at the second end 1104 of each of the cylinders 1132, 1134 contacts an adjacent hub structure 1120 (illustrated in FIG. 6). The snap fit of the snap fit arm 1170 and the contact with the hub structure 1120 maintains the multi-piece bore basket 1130 in axial position. In alternate examples, the snap fit features can be replaced by loose fit features and achieve a similar effect.

Figure 8:
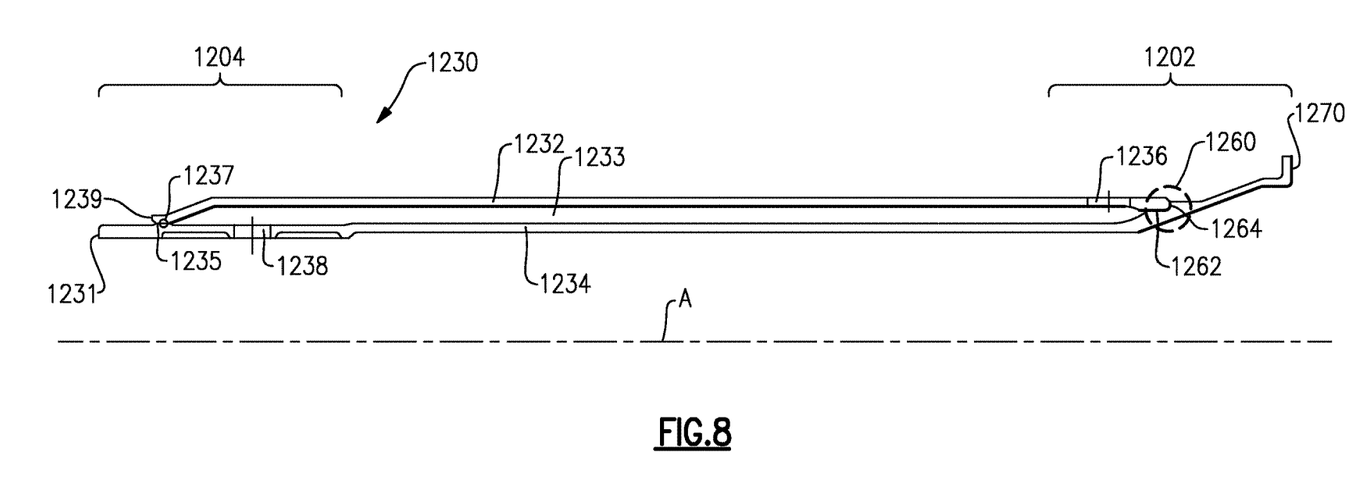
FIG. 8 schematically illustrates a cross section of an alternate multi-piece bore basket of isolated from the gas turbine engine.

With continued reference to FIGS. 6 and 7, and with like numerals indicating like elements, FIG. 8 schematically illustrates a cross section of an alternate example multi-piece bore basket 1230. As with the example of FIG. 7, the multi-piece bore basket 1230 includes an outward cylinder 1232 and an inward cylinder 1234. The inward cylinder 1234 is disposed within the outward cylinder 1232, and the two cylinders 1232, 1234 are generally coaxial, defining a single axis A. The cylinders 1232, 1234 define a fluid passageway 1233 in a gap between the two cylinders 1232, 1234.

The radially outward cylinder 1232 includes a radially aligned opening 1236 on a first end 1202 of the multi-piece bore basket 1230. In alternate examples, the radially outward cylinder 1232 can include multiple radially aligned openings disposed about the circumference of the first end 1202 of the radially outward cylinder 1232. Similarly, the inward cylinder 1234 includes a radially aligned opening 1238 disposed at the second end 1204 of the multi-piece bore basket 1230. In alternate examples, the radially inward cylinder 1234 can include multiple radially aligned openings 1238 disposed about the circumference of the second end 1204.

The radially outward cylinder 1232 contacts the radially inward cylinder 1234 at a first end 1202 contact surface 1262 and a second end 1204 contact surface 1237. The second end 1204 contact surface 1237 is defined on a radial protrusion 1235 that protrudes radially outward from the inward cylinder 1235. The first end contact surface 1262 is positioned within a retaining structure 1260. The retaining structure 1260 includes a step feature 1264 having a radially aligned surface and an axially aligned surface (the contact surface 1262). An axial end of the radially outward cylinder 1230 is positioned within the step feature 1264 such that both the radially aligned surface, and the axially aligned surface contact the radially outward cylinder 1230.

On the second end 1204, the radially outward cylinder 1232 includes an axial end surface 1239. The axial end surface 1239 contacts a fore hub structure 1220 (illustrated in FIG. 9) when the multi-piece bore basket 1230 is installed. The contact with the fore hub structure 1220 and the retaining feature 1260 prevents the radially outward cylinder 1232 from shifting axially relative to the radially inward cylinder 1234. The radially inward cylinder 1234 further includes a snap fit arm 1270 that provides a snap fit against an adjacent rotor bore 1110 (not pictured) when the multi-piece bore basket 1230 is in an installed position. When the multi-piece bore basket 1230 is in an installed position, a radially aligned surface 1231 at the second end 1204 of the multi-piece bore basket 1230 contacts the for hub structure. The snap fit of the snap fit arm 1270 and the contact with the hub structure maintains the multi-piece bore basket 1130 in axial position, as well as maintaining the two cylinders 1232, 1234 in axial position relative to each other.

Figure 9:
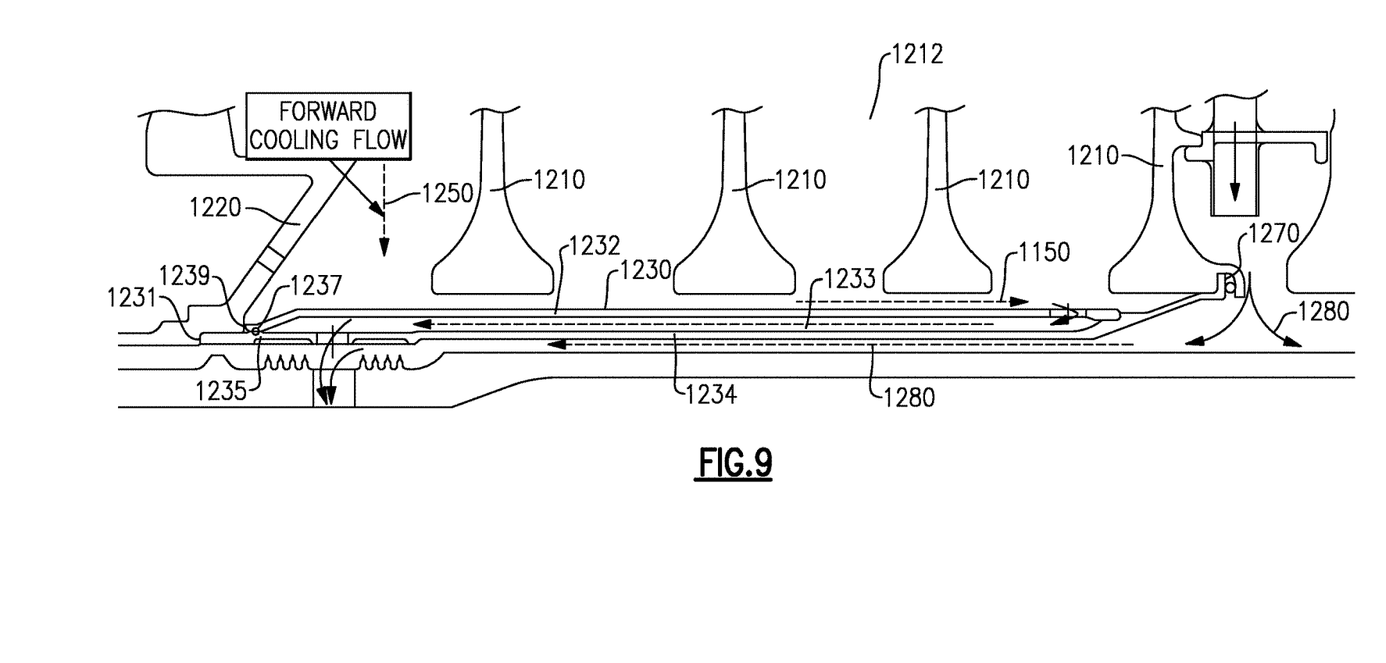
FIG. 9 schematically illustrates the alternate multi-piece bore basket of FIG. 4 in a gas turbine engine.

With continued reference to FIGS. 6 and 8, and with like numerals indicating like elements, FIG. 9 schematically illustrates the alternate multi-piece bore basket 1230 of FIG. 8 installed in a gas powered turbine. As with the example multi-piece bore basket 1130 of FIG. 6, the multi-piece bore basket 1230 directs a cold air flow 1250 across the rotor bores 1210 and into a fluid passageway 1233 in the multi-piece bore basket 1230. The snap fit arm 1270 of the multi-piece bore basket 1230 connects to an aft most rotor bore 1210, and a foremost surface 1231, 1239 or each cylinder 1232, 1234 contacts the rotor hub structure 1220. The example multi-piece bore basket 1230 of FIG. 9 isolates a hot air flow 1280 from the cold air flow 1250, and prevents backflow into a rotor bore opening 1212 in the manner described above with regards to FIG. 6.

While the above bore baskets 130, 230, 1130, 1230 are described with regards to a rotor section in a gas powered turbine engine 20, it is understand that the same principles and components could be applied to any gas powered turbine, including a land based turbine, and are not limited to aircraft engines.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine comprising:
   a compressor section;
   a combustor fluidly connected to the compressor;
   a turbine section fluidly connected to the combustor;
   a rotor bore opening disposed radially inward of a plurality of rotors in one of said compressor section and said turbine section, wherein the rotor bore opening is defined by a forward hub structure, a bore basket and a connection between said bore basket and an aft most rotor bore in said rotor bore opening;
   said bore basket defines a cylinder having an axis, and wherein said bore basket comprises;
      a radially outward first cylinder having at least one radially aligned opening on a first end of said bore basket;
      a radially inward second cylinder having a radially aligned opening on a second end of said bore basket opposite said first end, and being disposed within said radially outward first cylinder;
      an axially aligned gap defined by said radially outward first cylinder and said radially inward second cylinder; and
   a first cooling fluid flowpath defined between said first cylinder and said second cylinder;
   a second cooling flowpath defined radially inward of the second cylinder; and
   wherein the first cooling flowpath and the second cooling flowpath merge at the radially aligned opening on the second end of the bore basket.

2. The gas turbine of claim 1, wherein said first end of said bore basket is aftward relative to fluid flow, and wherein said second end of said bore basket is forward relative to fluid flow.

3. A gas turbine comprising:
   a compressor section;
   a combustor fluidly connected to the compressor;
   a turbine section fluidly connected to the combustor;
   a rotor bore opening disposed radially inward of a plurality of rotors in one of said compressor section and said turbine section, wherein the rotor bore opening is defined by a forward hub structure, a bore basket and a connection between said bore basket and an aft most rotor bore in said rotor bore opening;
   said bore basket defines a cylinder having an axis, and wherein said bore basket comprises;
      a radially outward first cylinder having at least one radially aligned opening on a first end of said bore basket;
      a radially inward second cylinder having a radially aligned opening on a second end of said bore basket opposite said first end, and being disposed within said radially outward first cylinder;
   an axially aligned gap defined by said radially outward first cylinder and said radially inward second cylinder;
   wherein said radially outward first cylinder contacts said radially inward second cylinder at a radial protrusion on said second end of said bore basket, and contacts said radially inward second cylinder at a retaining structure on said first end of said bore basket; and
   wherein one of said radially outward first cylinder and said radially inward second cylinder comprises a snap fit arm and said snap fit arm is disposed on said first end of said bore basket.

4. The gas turbine of claim 3, wherein
said retaining structure is a retaining ring positioned aft of a pair of contact surfaces;
said radially outward first cylinder contacts said radially inward second cylinder;
said retaining ring is disposed at least partially within one of said radially outward first cylinder and said radially inward second cylinder; and
said retaining ring contacts a radially aligned edge of the other of said radially outward first cylinder and said radially inward second cylinder.

5. The gas turbine of claim 3, wherein said retaining structure is a radially protruding shoulder disposed on said radially inward second cylinder, and wherein said radially outward first cylinder contacts at least two surfaces of said shoulder.

6. The gas turbine of claim 5, wherein a forward end of said first radially outward cylinder contacts a structure of said gas turbine.

7. The gas turbine of claim 3, wherein said snap fit arm comprises a radially aligned snap fit feature on an axial end of said snap fit arm.

8. The gas turbine of claim 1, further comprising a hub structure at least partially defining a forward wall of said rotor bore opening, and wherein said structure includes a cool air inlet into said rotor bore opening, and wherein said hub, said rotor bore opening, and said bore basket define a cool air flowpath from said inlet, along a radially outward surface of said first radially outward cylinder, through said radially aligned opening on a first end of said bore basket into said gap defined by said radially outward first cylinder and said radially inward second cylinder, and through said radially aligned opening on a second end of said bore basket opposite said first end.

9. The gas turbine of claim 1, wherein said radially outward first cylinder and said radially inward second cylinder are maintained in position relative to each other at least in part via a tight fit connection between at least one contact surface of the radially inward cylinder and at least one contact surface of the radially outward cylinder.

10. The gas turbine of claim 1, wherein said radially outward first cylinder and said radially inward second cylinder are maintained in position relative to each other at least in part via compression forces of gas turbine engine components external to said bore basket.

11. The gas turbine of claim 1, further comprising a mechanical interconnection connecting said radially outward first cylinder to said radially inward second cylinder, such that said radially outward first cylinder and said radially inward second cylinder are a unitary structure.

12. The gas turbine of claim 11, wherein said mechanical interconnection is at least one of a brazed connection and a welded connection.

13. The gas turbine of claim 11, wherein the bore basket further comprises a plurality of structural struts connecting said first radially outward cylinder to said radially inward cylinder, and wherein the plurality of structural struts are disposed circumferentially about said radially inward strut at least one axial position.

14. The gas turbine of claim 13, wherein said plurality of structural struts are mechanically interconnected with at least one of said first radially outward cylinder and said radially inward cylinder, such that plurality of structural struts and the bore basket comprise a unitary structure.

15. The gas turbine of claim 11,
wherein said radially inward cylinder comprises a seat structure having an axially aligned surface, wherein said axially aligned surface of said seat structure contacts an inner surface of said first radially outward cylinder; and
wherein said mechanical interconnection is a mechanical interconnection between said axially aligned surface of said seat structure and said inner surface of said first radially outward cylinder.

16. The gas turbine engine of claim 1, wherein the second cooling flowpath is isolated from the first cooling flowpath by said radially inward second cylinder.

17. The gas turbine engine of claim 1, wherein the first cooling flowpath originates at a forward end of the bore basket, and wherein the second cooling flowpath originates at an aft end of the bore basket.

18. The gas turbine engine of claim 17, wherein the first cooling flowpath travels axially aft along a radially outer surface of the first radially outward cylinder, through the first opening at the first end of said bore basket, and axially forward through said gap.

19. A bore basket arrangement comprising:
bore basket defining a cylinder having an axis, and wherein said bore basket includes;
a radially outward first cylinder having at least one radially aligned opening on a first end of said bore basket;
a radially inward second cylinder having a radially aligned opening on a second end of said bore basket opposite said first end, and being disposed within said radially outward first cylinder;
an axially aligned gap defined by said radially outward first cylinder and said radially inward second cylinder, the axially aligned gap defining a first cooling flowpath;
the radially inward second cylinder partially defining a second cooling flowpath radially inward of the second cylinder; and
wherein the first cooling flowpath and the second cooling flowpath merge at the radially aligned opening on the second end of the bore basket.

20. The bore basket arrangement of claim 19, wherein said radially outward cylinder and the radially inward second cylinder are a unitary structure.

21. The bore basket arrangement of claim 19, wherein said radially outward cylinder and the radially inward second cylinder are separate structures.

22. A method for cooling rotor bores in a rotor bore opening comprising:
injecting cool air into a fore end of a rotor bore opening;
directing said cool air to an aft end of said rotor bore opening along an exterior surface of a bore basket;
defining an internal fluid passageway in said bore basket as a gap between a radially inward cylinder and a radially outward cylinder, where the radially outward cylinder and the radially inward cylinder are one of a unitary structure and a separate structure; and
returning said cool air to a fore end of said bore basket through said internal fluid passageway of said bore basket.

* * * * *